United States Patent
Dotan et al.

(10) Patent No.: US 8,752,172 B1
(45) Date of Patent: Jun. 10, 2014

(54) PROCESSING EMAIL MESSAGES BASED ON AUTHENTICITY ANALYSIS

(75) Inventors: Yedidya Dotan, Tel Aviv (IL);
Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 350 days.

(21) Appl. No.: 13/169,167

(22) Filed: Jun. 27, 2011

(51) Int. Cl.
*G06F 11/00* (2006.01)
*G06F 15/16* (2006.01)

(52) U.S. Cl.
USPC ............. 726/22; 726/23; 726/24; 726/25; 726/26; 709/206

(58) Field of Classification Search
USPC ................................ 726/22–26; 709/206
See application file for complete search history.

(56) References Cited

U.S. PATENT DOCUMENTS

| | | | |
|---|---|---|---|
| 7,457,958 B2 * | 11/2008 | Olkin et al. | 713/176 |
| 7,917,757 B2 * | 3/2011 | Backer | 713/176 |
| 7,966,492 B1 * | 6/2011 | Gasparini et al. | 713/170 |
| 8,073,912 B2 * | 12/2011 | Kaplan | 709/206 |
| 8,103,875 B1 | 1/2012 | Ramzan et al. | |
| 8,132,243 B2 | 3/2012 | Bychkov | |
| 8,189,924 B2 * | 5/2012 | Iofis | 382/216 |
| 8,219,630 B2 * | 7/2012 | Cunningham | 709/206 |
| 8,239,458 B2 * | 8/2012 | Agarwal et al. | 709/206 |
| 8,260,862 B2 * | 9/2012 | Chatterjee | 709/206 |
| 8,370,389 B1 | 2/2013 | Dotan | |
| 8,370,899 B2 | 2/2013 | Shoval et al. | |
| 8,392,420 B2 | 3/2013 | Mellmer et al. | |
| 8,443,192 B2 | 5/2013 | Hunneybell | |
| 2004/0249934 A1 * | 12/2004 | Anderson et al. | 709/224 |
| 2006/0047605 A1 * | 3/2006 | Ahmad | 705/64 |
| 2006/0090073 A1 * | 4/2006 | Steinberg et al. | 713/170 |
| 2006/0179157 A1 * | 8/2006 | Huang | 709/238 |
| 2007/0005967 A1 * | 1/2007 | Mister et al. | 713/168 |
| 2007/0233789 A1 * | 10/2007 | Agarwal et al. | 709/206 |
| 2007/0233790 A1 * | 10/2007 | Agarwal et al. | 709/206 |
| 2011/0055562 A1 * | 3/2011 | Adelman et al. | 713/168 |
| 2011/0055911 A1 * | 3/2011 | Adelman et al. | 726/7 |
| 2011/0072077 A1 * | 3/2011 | Tomkow | 709/203 |
| 2011/0145889 A1 * | 6/2011 | Tomkow | 726/3 |

* cited by examiner

*Primary Examiner* — Krisna Lim
(74) *Attorney, Agent, or Firm* — BainwoodHuang

(57) ABSTRACT

A technique processes an email message. The technique involves receiving the email message from a network, and performing an authenticity analysis operation to determine authenticity of the email message. The technique further involves forwarding a copy of the email message to an external central hub through the network when a result of the authenticity analysis operation indicates that the email message is not authentic, and refraining from sending the copy of the email message to the external central hub through the network when the result of the authenticity analysis operation indicates that the email message is authentic. Such an embodiment is well suited for identifying spear phishing attacks within email messages routinely handled by an email server.

21 Claims, 4 Drawing Sheets

PROCESSING EMAIL MESSAGES BASED ON AUTHENTICITY ANALYSIS

BACKGROUND

Phishing is an attempt by a fraudster to obtain sensitive information from computer users by masquerading as a trustworthy entity in an electronic communication. In one conventional scheme, the fraudster sends emails which appear to be from the trustworthy entity indiscriminately to a large number of computer users. Such emails typically contain a manipulated link to the fraudster's website (i.e., a spoof website which appears to be the website of the trustworthy entity) and instruct the computer users to go to that website using the link to perform various operations (e.g., login, update user information, change passwords, confirm accounts, etc.). Once a computer user goes to the fraudster's website and follows the instructions, the fraudster is able to exploit that computer user (e.g., load malicious code onto the user's computer, login to an actual trustworthy entity as that computer user, etc.).

To protect computer users against phishing attacks, general warnings are often provided to the computer users informing them to avoid emails that (i) include links and (ii) instruct the computer users to click on the links to access websites. When a particular email has been identified as an actual phishing attack (e.g., due to the wide distribution and long lasting prevalence of that email), a precise warning may be provided to the computer users informing them to avoid that particular email if it is received (e.g., to not follow instructions in that email and to immediately delete that email if that email is received).

Spear phishing is similar to phishing but targets specific computer users. For example, the fraudster may be able to obtain personal information about a specific computer user (e.g., the name of that computer user's bank, the name of a friend or family member, etc.), and then include that personal information in a custom email to that computer user in hope that the demonstrated familiarity with that personal information convinces that computer user that the email is not a hoax. The personal information may come from a variety of sources including the specific computer user's social network, knowledge of the specific computer user's title/position at a company, a phone call to the specific computer user's place of business, etc. Also, a spear phishing email may solicit activation of an executable file and thus insert malware into an organization.

SUMMARY

Unfortunately, application of conventional approaches against phishing attacks does not usually lead to successful results when applied to spear phishing attacks. For example, since a spear phishing email from a fraudster is precisely targeted to a particular computer user, there is not wide distribution of the spear phishing email or a long lasting prevalence that would otherwise enable the particular computer user to be effectively warned in advance. Rather, the spear phishing email may appear unassuming and the personal information within the spear phishing email may be effective in convincing the particular computer user that the email is genuine. Accordingly, the email may persuade the particular computer user to follow the fraudster's instructions and divulge sensitive information to the fraudster. As a result, the particular computer user becomes a spear phishing victim and the fraudster succeeds in acquiring the particular computer user's sensitive information.

Improved techniques involve processing email messages to determine their authenticity and automatically providing copies of email messages deemed not to be authentic to an external central hub. Such operation can be performed as email messages are received by an email server (e.g., scanning at the gate) and can include multi-factor analysis (e.g., risk criteria) to select which emails to provide to the external central hub. Additionally, such operation enables the external central hub to employ closer manual review and take remedial action (e.g., fingerprinting of fraudster devices on a public network, blocking further traffic and/or shutting them down). Furthermore, such operation can be conveniently adjusted over time to control the number or percentage (e.g., 5%) of email messages that are provided to the external central hub for closer inspection.

One embodiment is directed to a method of processing an email message. The method includes receiving the email message from a network, and performing an authenticity analysis operation to determine authenticity of the email message. The method further includes forwarding a copy of the email message to an external central hub through the network when a result of the authenticity analysis operation indicates that the email message is not authentic, and refraining from sending the copy of the email message to the external central hub through the network when the result of the authenticity analysis operation indicates that the email message is authentic. Such an embodiment is well suited for identifying spear phishing attacks within email messages routinely handled by an email server.

Other embodiments are directed to electronic systems, electronic servers (e.g., an email server), central hubs, computer program products, devices which process email messages, and so on. Some embodiments are directed to various methods, electronic components and circuits which are involved in processing and/or evaluating email messages.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves processing an email message to determine authenticity of the email message and automatically providing a copy of the email message to an external central hub if the email message is deemed not to be authentic. Such operation can be performed as the email message is received by an email server (e.g., scanning at the gate) and can include multi-factor analysis (e.g., risk criteria). The email message can then be closely reviewed by a human for possible remedial action (e.g., fingerprinting of a fraudster device, blocking further traffic from the fraudster device, notifying authorities to shutdown the fraudster device, and so on). Other email messages can be processed in a similar manner while controlling the number or percentage (e.g., 5%) of email messages that are ultimately provided to the external central hub for closer inspection.

Figure 1:
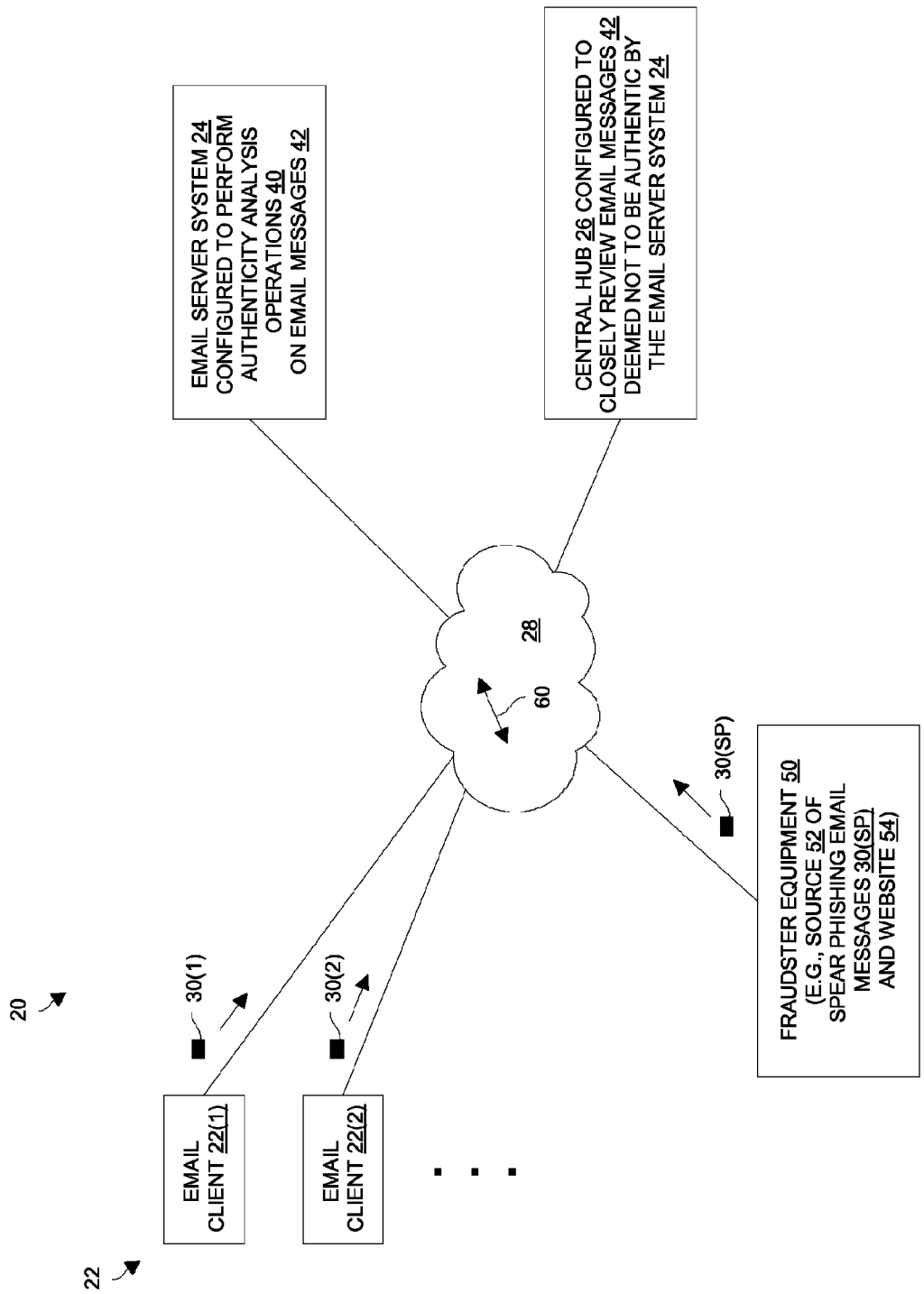
FIG. 1 is a block diagram of an electronic environment for processing email messages based on authenticity analysis.

FIG. 1 shows an electronic environment 20 which involves processing email messages based on authenticity analysis. The electronic environment 20 includes email clients 22(1), 22(2), . . . (collectively, the email clients 22), an email server system 24, a central hub 26, and a communications medium 28.

Each email client 22 is operated by a user and is capable of sending email messages 30 to the email server system 24, as well as receiving email messages 30 from the server system 24. By way of example, the email client 22(1) is shown sending an email message 30(1) to the email server system 24. Similarly, the email client 22(2) is shown sending an email message 30(2) to the email server system 24, and so on. Examples of suitable email client devices 22 include general purpose computers, laptops, smart phones, portable computerized devices, specialized hardware, online email systems, etc. which are equipped with email sending and receiving capabilities.

The email server system 24 is constructed and arranged to provide email services on behalf of multiple users, e.g., receive and buffer email messages 30 prior to delivery to the email clients 22. Examples of such email services include those which are provided by a Microsoft® Exchange Server offered by Microsoft Corporation of Redmond, Wash. Additionally, the email server system 24 is constructed and arranged to perform authenticity analysis operations 40 on the email messages 30 to make determinations as to whether email messages 30 handled by the email server system 24 are authentic or fraudulent. For example, fraudster equipment 50 may exist in the electronic environment 20 and operate as an email source 52 of spear phishing email messages 30(SP) to lure targeted users of the email clients 22 to a fraudster website 54 in hope of stealing sensitive data from the users.

The central hub 26 is constructed and arranged to provide an electronic platform through which a critical incident response team receives, reviews and identifies whether email messages 30 from the email server system 24 are fraudulent. In some arrangements, the central hub 26 includes a risk engine which automatically evaluates the copies of the email messages 30 (or simply email messages 30) for fraud (e.g., watermarks, inconsistencies, special traits, etc.). If an email message 30 is deemed to be fraudulent and warrant further review, the critical incident response team attempts to fingerprint the fraudster (i.e., confirm that the email message 30 is fraudulent and precisely identify the email source 52 of the fraudster equipment 50) and then contact proper authorities to stop and perhaps even apprehend the fraudster.

The communications medium 28 connects the various electronic components of the electronic environment 20 together to enable the electronic components to exchange electronic communications 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based devices and cabling, fiber optic devices and cabling, wireless devices, combinations thereof, and so on. Moreover, some portions of the communications medium 28 may include a computer network (e.g., the Internet, a LAN, a VPN, etc.) while other portions may include a different type of network (e.g., SAN hardware, etc.).

During operation of the electronic environment 20, the email clients 22 exchange email messages 30 among each other. In particular, the email server system 24 receives and temporarily buffers the email messages 30 from the email clients 22 (and perhaps email servers in the electronic environment 20). The email server system 24 then delivers the temporarily buffered email messages 30 to the email clients 22 upon request.

As the email server system 24 receives each email message 30, the email server system 24 performs an authenticity analysis operation 40 on that email message 30. As will be explained in further detail shortly, the authenticity analysis operation 40 involves generation of a risk score and comparison of the risk score to a predetermined threshold in order to determine the likelihood that the email message 30 is fraudulent. If the authenticity analysis operation 40 indicates that it is highly likely that the email message 30 is fraudulent, the email server system 24 forwards a copy of the email message to the central hub 26 for further analysis. However, if the authenticity analysis operation 40 indicates that it is highly likely that the email message 30 is not fraudulent (i.e., the email message is authentic), the email server system 24 refrains from forwarding a copy of the email message to the central hub 26. Such operation effectively reduces the number of email messages received and analyzed by the central hub 26 while trying to ascertain fraudsters within the electronic environment 20 (e.g., the fraudster equipment 50). Further details will now be provided with reference to FIG. 2.

Figure 2:
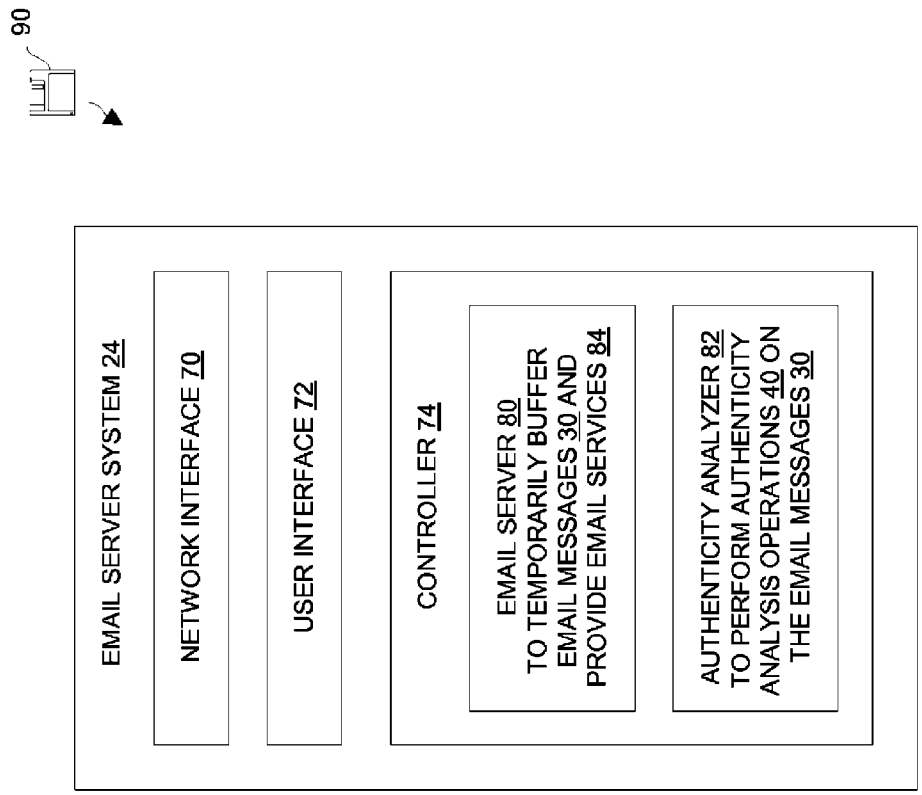
FIG. 2 is a block diagram of an electronic device of the electronic environment of FIG. 1.

FIG. 2 shows details of the email server system 24 which is constructed and arranged to perform the authenticity analysis operations 40 on the email messages 30 (also see FIG. 1). The email server system 24 includes a network interface 70, a user interface 72, and a controller 74.

The network interface 70 enables the email server system 24 to connect to the communications medium 28 (FIG. 1) and thus communicate with other devices of the electronic environment 20. In some arrangements, the network interface 70 is implemented in the form of a network card or a network adapter module.

The user interface 72 receives input from a user (e.g., an administrator of the email server system 24) and provides output to the user. To this end, the user interface 72 includes a keyboard, a mouse, a display, and hardware/physical ports for other types of user communications (e.g., magnetic I/O, optical I/O, wireless I/O, etc.).

The controller 74 includes an email server 80 and an authenticity analyzer 82. The email server 80 receives email messages 30 from sending email clients 22 through the network interface 70, and temporarily buffers the email messages 30 until receiving email clients 22 are ready for delivery. When an email client 22 prompts the email server 80 email messages 30 collected and buffered on behalf of that email client 22 (if any), the email server 80 delivers those email messages 30 to that email client 22 through the network interface 70 (if any). The email server 80 provides a variety of other email services 84 as well. Such email services 84 include management of a database of email user accounts, control of buffer sizes, imposition and maintenance of certain rules and protocols, and so on. Such email services 84 are capable of being established, customized and adjusted by a user (e.g., an email server administrator) using the user interface 72.

The authenticity analyzer 82 performs authenticity analysis operations 40 on the email messages 30 which are handled by the email server 80 to assess whether the email messages 30 are authentic (i.e., from the actual users they purport to be from) or not authentic (i.e., from a fraudster attempting to steal sensitive information from a user of an email client 22). If the authenticity analyzer 82 makes a determination that a particular email message 30 is likely fraudulent, the authenticity analyzer 82 transmits a copy of the particular email message 30 to the central hub 26 for closer analysis. Further details of the authenticity analysis operations 40 will be provided shortly.

It should be understood that the controller 74 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 90 is capable of delivering all or portions of the software to the email server system 24. The computer program product 90 has a non-transitory (or non-volatile) computer readable medium which stores a set of instructions which controls one or more operations of the controller 74. Examples of suitable computer readable storage media include tangible articles of manufacture and apparatus which store instructions in a non-volatile manner such as CD-ROM, flash memory, disk memory, tape memory, and the like.

Additionally, it should be understood that, in some arrangements, the email server 80 runs substantially independently from the authenticity analyzer 82. For example, in the context of hardware implementation, the email server 80 and the authenticity analyzer 82 are formed by different physical circuits or perhaps reside in different physical locations and/or devices. Alternatively, in the context of a set of processors running specialized software, the email server 80 and the authenticity analyzer 82 run as separate processes, process trees, threads, etc. In a particular implementation, the authenticity analyzer 82 runs as an agent which monitors email traffic en route to the email server 80 from the communications medium 28 through the network interface 70.

In other arrangements, the email server 80 and the authenticity analyzer 82 are more closely coupled. In some arrangements, the authenticity analyzer 82 sits inline between the network interface 70 and the email server 80 to intercept email messages 30 en route to the email server 80. Such arrangements enable the authenticity analyzer 82 to block suspicious email messages 30 from reaching the email server 80, and allow only email messages 30 which are deemed safe to reach the email server 80, if such operation is desired. In yet closer-coupled arrangements, the authenticity analyzer 82 is integrated with the email server 80 to form an augmented or enhanced email server with authenticity analysis features (e.g., an enhancement module to the email server 80). Further details will now be provided with reference to FIG. 3.

Figure 3:
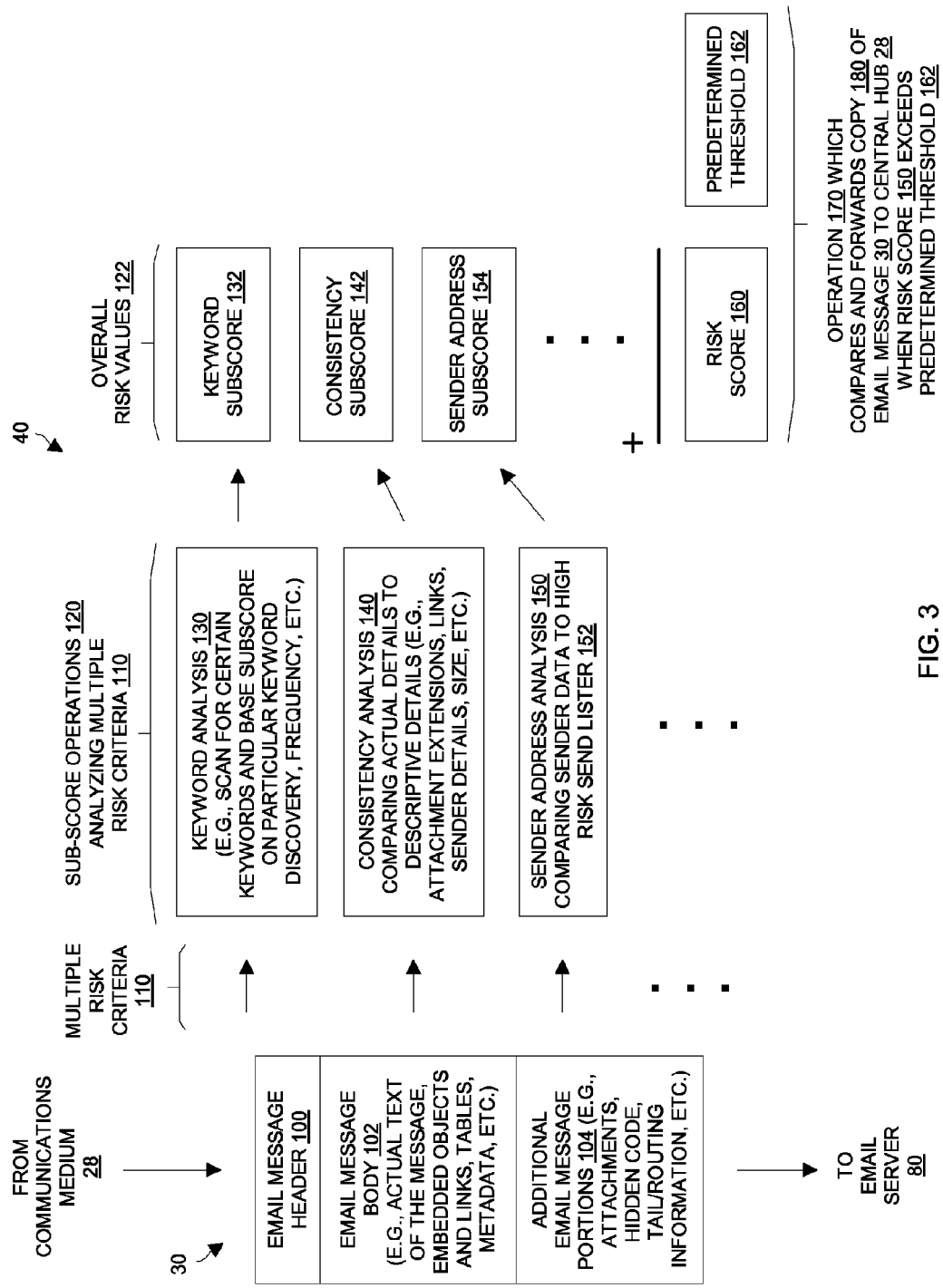
FIG. 3 is a block diagram of particular details of a set of authenticity analysis operations performed by the electronic device of FIG. 2.

FIG. 3 shows particular details of how circuitry of the authenticity analyzer 82 processes email messages 30 en route from the communications medium 28 to the email server 80 (also see FIGS. 1 and 2). Along these lines, as each email message 30 arrives through the network interface 70 of the email server system 24 for processing by the controller 74, the authenticity analyzer 82 performs authenticity analysis operations 40 to evaluate that email message 30 for possible forwarding to the central hub 26 for further analysis.

As shown in FIG. 3, the email message 30 includes a header portion 100, a body portion 102, and perhaps additional portions 104. The header portion 100 of the email message 30 includes header data such as information about the sender (i.e., sender properties), timestamp information, a subject line, etc. The body portion 102 includes actual text such as a salutation (e.g., "Dear John"), sentences which form the actual message from the sender, a signature of the sender, embedded objects and links, tables, pictures, logos, rich text information and other metadata, and so on. The email message 30 may include additional portions 104 such as such as file attachments, hidden code, tail/routing information, flags indicating priority and requesting receipt confirmation, and so on.

As an example, the body portion 102 of a particular email message 30 might look as follows:

Hi John,
It's been some time since I've heard from you. Please take a look at the attachment which includes highlights of my recent trip oversees.
I'll be in touch again shortly,
Frank It's quite possible that this particular email message 30 is fraudulent (e.g., a spear phishing attack), and the authenticity analyzer 82 is capable of performing a set of authenticity analysis operations 40 to make a determination as to whether to forward a copy of the particular email message 30 to the central hub 26 for further scrutiny.

Along these lines, the authenticity analyzer 82 examines various aspects of the email message 30 which are hereinafter referred to as risk criteria 110. In particular, the authenticity analyzer 82 performs sub-score operations 120 which analyze the risk criteria 110. That is, the sub-score operations 120 rate the various risk criteria 110 in terms of riskiness from various perspectives by outputting risk sub-scores 122 (i.e., values) associated with the risk criteria 110.

For example, the sub-score operations 120 include a keyword analysis operation 130 which scans the email message 30 for high-risk keywords and phrases such as "login", "reset", "password", "credit card", "account number", and so on. The keyword analysis operation 130 is further capable of detecting character or symbol strings having particular formats (e.g., standard password formats, standard credit card number formats, etc.). The keyword analysis operation 130 outputs, as a keyword sub-score, an overall keyword value 132 which is weighted based on the presence and frequency of the high-risk keywords, phrases and formats, in the email message 30. In some arrangements, each high-risk keyword, phrase, and format has an associated weight indicating an associated degree of risk. As a result, a high overall keyword value 132 indicates high risk due to discovery and frequency of use of such character and symbol constructs in the email message 30.

As another example, the sub-score operations 120 include a consistency analysis operation 140 which compares actual details of the email message 30 with descriptive details contained within the email message 30 (e.g., details within the body portion 102). The consistency analysis operation 140 outputs, as a consistency sub-score, an overall consistency value 142 which indicates how well the descriptive details matched the actual details. Along these lines, spear phishing attacks may contain small inconsistencies such as a request that the reader open an attached document (e.g., "please double click on the attached textfile which typically has ".doc" or ".txt" as an extension). However, a fraudster may substitute a malicious executable program (e.g., a file having ".exe" as an extension) and hope that the reader carelessly launches that program by trying to open it. Similarly, the descriptive details may refer to a company website such as "mybank.com" but perhaps include a link to "mybanc.com" (i.e., a fraudster's website) and invite the user to click on the link to login. Other details which are examined for consistency include actual email size vs. size information in an email tail, and path name consistencies, among others. The consistency analysis operation 140 searches for such inconsistencies and increases the magnitude of the overall consistency value 142 as more inconsistencies are discovered.

As yet another example, the sub-score operations 120 include a sender analysis operation 150 which compares sender data (e.g., contents of the display name, sender email address, other sender properties, etc.) to information on a high risk sender list 152. The sender analysis operation 150 outputs, as a sender sub-score, an overall sender address value 154 which indicates how well the sender data of the email message 30 matches information on the high risk sender list 152 which is updated over time. In some situations, the sender analysis operation 150 provides different weights depending on which entries of the high risk sender list 152 match the sender data. The sender address operation 150 searches for such matches and increases the magnitude of the overall sender address value 154 as more matches are discovered.

As the sub-score operations 120 outputs the risk sub-scores 122, the authenticity analyzer 82 sums the risk sub-scores 122 together to generate an aggregate value, i.e., a risk score 160. In the example above, the risk score 160 includes the overall keyword value 132, the overall consistency value 142, and the overall sender address value 154, among other sub-scores 122. This risk score 160 is essentially an indicator of how likely the email message 30 is to being genuine (i.e., from a legitimate sender). That is, the higher the risk score 160, the more likely the email message 30 is to being fraudulent.

Once the authenticity analyzer 82 has generated the risk score 160, the authenticity analyzer 82 compares the risk score 160 to a predetermined threshold 162. If the risk score 160 is less than the predetermined threshold 162, the authenticity analyzer 82 deems the email message 30 to be authentic and refrains from forwarding a copy of the email message 30 to the central hub 26. However, if the risk score 160 exceeds the predetermined threshold 162, the authenticity analyzer 82 deems the email message 30 to be suspicious warranting further analysis, and performs a forwarding operation 170 which forwards a copy 180 of the email message 30 to the central hub 26 for additional review (e.g., watermarking, fingerprinting, etc.).

It should be understood that the predetermined threshold 162 is a tunable parameter which is modifiable over time. For example, a user enters an initial value for the predetermined threshold 162 using the user interface 72 at an initial setup time. A low value for the predetermined threshold 162 likely results in a high percentage of copies 180 of email messages 30 forwarded to the central hub 26 (i.e., easier for risk scores 160 to exceed the predetermined threshold 162). A high value for the predetermined threshold 162 likely results in a low percentage of copies 180 of email messages 30 forwarded to the central hub 26 (i.e., harder for risk scores 160 to exceed the predetermined threshold).

After a period of operation, the user is capable of setting the predetermined threshold 162 to a new value to obtain a different desired performance (e.g., a certain target number of copies 180 of email messages 30 forwarded per week, a certain target percentage, etc.). It is expected that the period of initial operation is long enough to allow the user to have a reliable and stable view of the email volume for a given period of time. Accordingly, if the user sets a goal to send a certain volume of email messages 30 (e.g., 10 email messages per day, 100 email messages per week, 1%, 5%, etc.) to the central hub 26 for scrutiny as possible fraudster emails, the user can adjust the predetermined threshold 162 higher or lower to achieve that performance.

It should be understood that the authenticity analyzer 82 is adaptable in that the sub-score operations 120 can be modified, and/or further sub-score operations 120 can be added. As a result, the authenticity analyzer 82 is capable of changing and evolving as the habits and tendencies of fraudsters change over time. Further details will now be provided with reference to FIG. 4.

Figure 4:
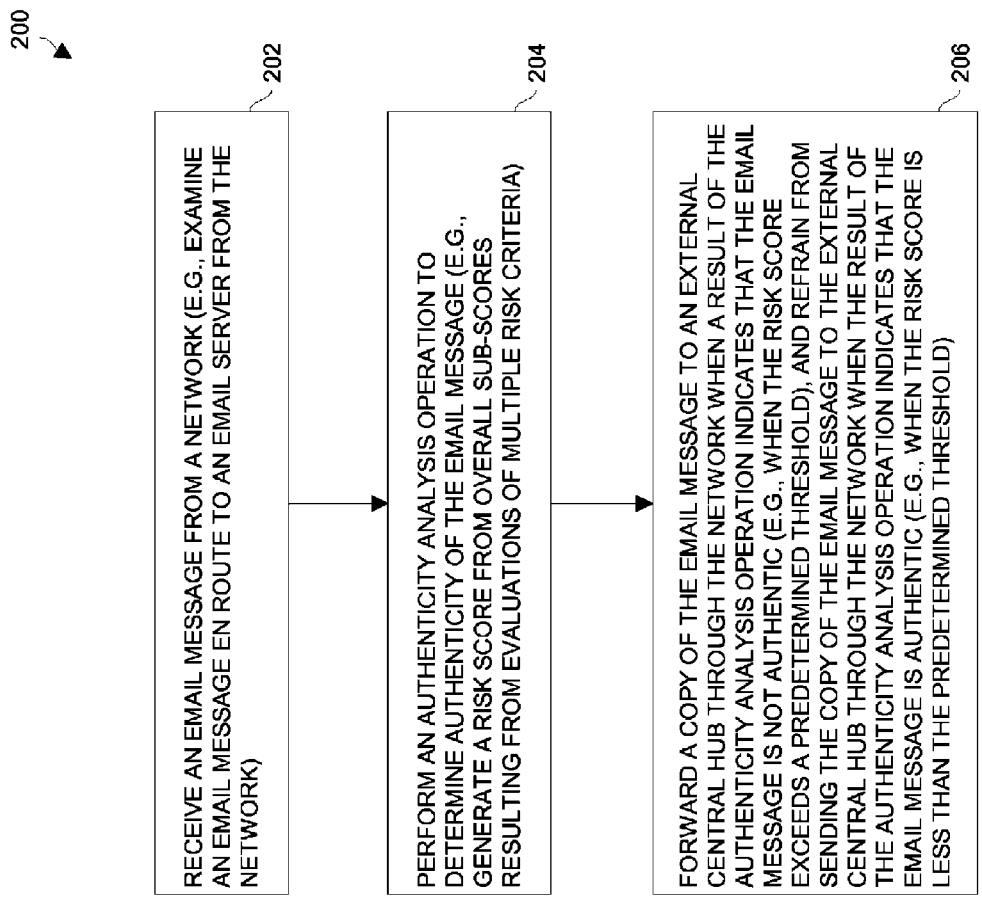
FIG. 4 is a flowchart of a procedure which is performed by the electronic device of FIG. 2.

FIG. 4 shows a flowchart of a procedure 200 for processing an email message 30 which is performed by the authenticity analyzer 82 (also see FIG. 3). In step 202, the authenticity analyzer 82 receives the email message 30 from the communications medium 28 through the network interface 70 (also see FIG. 2). The email message 30 is en route to the email server 80 (FIG. 2) for buffering and eventual delivery to an email client 22 (FIG. 1).

In step 204, the authenticity analyzer 82 performs an authenticity analysis operation 40 to determine authenticity of the email message 30. In particular, it is possible that the email message 30 is not genuine but from a fraudster attempting to obtain sensitive information from the user of the email client 22 (also see the fraudster equipment 50 in FIG. 1). To this end, the authenticity analyzer 82 generates a risk score 160 from a set of sub-scores 122 (i.e., overall risk values) resulting from evaluations of multiple risk criteria 110 (FIG. 3).

In step 206, the authenticity analyzer 82 forwards a copy 180 of the email message 30 to an external central hub 26 through the communications medium 28 when a result of the authenticity analysis operation 40 indicates that the email message 30 is not authentic, and refrains from sending the copy of the email message to the external central hub 26 through the communications medium 28 when the result of the authenticity analysis operation 40 indicates that the email message 30 is authentic. Such operation enables the authenticity analyzer 82 to smartly determine the likelihood that the email message 30 is fraudulent, as well as control the volume of email messages 30 forwarded to the central hub 26.

Moreover, the central hub 26 is then able to gather and focus attention on a relatively small set of email messages 30 for comparison and fingerprinting purposes. In particular, the central hub 26 is able to devote attention to substantially less than 100% of the email messages 30 received and processed by the email server 80. Such operation may enable the central hub 26 to identify fraudster equipment 50 (FIG. 1) in the electronic environment 20, and shutdown (and possibly apprehend) the operators of the fraudster equipment 50 before the operators move on or cause further harm.

In some arrangements, the central hub 26 is constructed and arranged to receive and evaluate copies 180 of email messages 30 from multiple email server systems 24 within the electronic environment 20. To change the number of emails received by the central hub, the predetermined thresholds 162 can be tuned (e.g., set higher or lower).

As described above, improved techniques involve processing email messages 30 to determine their authenticity and automatically providing copies 180 of email messages 30 deemed not to be authentic to an external central hub 26. Such operation can be performed as email messages 30 are received by an email server 80 (e.g., scanning at the gate) and can include multi-factor analysis (e.g., evaluation of risk criteria 110) to select which email messages 30 to provide to the external central hub 26. Additionally, such operation enables the external central hub 26 to employ closer manual review and take remedial action (e.g., fingerprinting of fraudster devices on a public network, blocking further traffic and/or shutting them down, etc.). Furthermore, such operation can be conveniently adjusted to control the number or percentage (e.g., 0.5%, 1%, 5%, 10%, etc.) of email messages 30 that are provided to the external central hub 26 for closer inspection.

While various embodiments of the invention have been particularly shown and described, it will be understood by those skilled in the art that various changes in form and details may be made therein without departing from the spirit and scope of the invention as defined by the appended claims.

For example, the risk score 160 was described above as indicating higher risk with higher values. In other arrangements, the various components can be constructed and arranged to operation so that the risk score 160 indicates lower risk with higher values. In such an arrangement, the authenticity analyzer 82 refrains from sending a copy of an evaluated email message 30 when the risk score 160 exceeds the predetermined threshold 162, and sends a copy 180 of the evaluated email message 30 to the central hub 26 when the risk score 160 is lower than the predetermined threshold 162.

As another example, the above-described techniques are suitable for working in tandem with other approaches and mechanisms which protect against fraud. For example, the authenticity analyzer 82 is capable of being configured to search email messages 30 en route to the email server 80 for fraudster traits which are identified by other devices (e.g., authentication managers, adaptive authentication databases, antivirus software, components of an eFraud network, and so on). Such modifications and enhancements are intended to belong to various embodiments of the invention.

What is claimed is:

1. In an electronic system, a method of processing an email message, the method comprising:
   receiving the email message from a network;
   performing an authenticity analysis operation to determine authenticity of the email message; and
   forwarding a copy of the email message to an external central hub through the network when a result of the authenticity analysis operation indicates that the email message is not authentic, and refraining from sending the copy of the email message to the external central hub through the network when the result of the authenticity analysis operation indicates that the email message is authentic;
   wherein performing the authenticity analysis operation to determine authenticity of the email message includes:
   generating a risk score based on the email message, and
   providing, as the result of the authenticity analysis operation, (i) a first value indicating that the email message is not authentic when the risk score exceeds a predetermined threshold, and (ii) a second value indicating that the email message is authentic when the risk score does not exceed the predetermined threshold.

2. A method as in claim 1 wherein the electronic system includes an agent and an email server; and
   wherein generating the risk score based on the email message is performed by the agent while the email server delivers the email message to an email client.

3. A method as in claim 2 wherein, when the result of the authenticity analysis operation indicates that the email message is not authentic, forwarding the copy of the email message to the external central hub through the network is performed by the agent after the email server delivers the email message to the email client.

4. A method as in claim 1 wherein the electronic system includes an enhancement module to an email server, the email server being constructed and arranged to deliver email messages to an email client; and
   wherein the enhancement module generates the risk score based on the email message prior to any delivery of the email message from the email server to the email client.

5. A method as in claim 4 wherein, when the result of the authenticity analysis operation indicates that the email message is not authentic, the enhancement module forwards the copy of the email message to the external central hub through the network and prevents delivery of the email message from the email server to the email client.

6. A method as in claim 1 wherein the electronic system includes a risk engine which is constructed and arranged to generate numerical risk scores for email messages, each numerical risk score being a quantitative measure which indicates a likelihood that a particular email message is fraudulent; and wherein the method further comprises:
   when the result of the authenticity analysis operation indicates that the email message is authentic, sending the email message to a client device via an email server based on a user address of the email message to enable a user to read the email message, the client device being external to the electronic system.

7. A method as in claim 1 wherein generating the risk score based on the email message includes:
   providing, as the risk score, a numerical aggregation of a set of sub-score values, each sub-score value being a respective measure of riskiness of the email message from a perspective of a different risk criteria.

8. In an electronic system, a method of processing an email message, the method comprising:
   receiving the email message from a network;
   performing an authenticity analysis operation to determine authenticity of the email message; and
   forwarding a copy of the email message to an external central hub through the network when a result of the authenticity analysis operation indicates that the email message is not authentic, and refraining from sending the copy of the email message to the external central hub through the network when the result of the authenticity analysis operation indicates that the email message is authentic;
   wherein performing the authenticity analysis operation to determine authenticity of the email message includes:
   generating a risk score based on the email message, and
   providing, as the result of the authenticity analysis operation, (i) a first value indicating that the email message is not authentic when the risk score exceeds a predetermined threshold, and (ii) a second value indicating that the email message is authentic when the risk score does not exceed the predetermined threshold; and
   wherein generating the risk score based on the email message includes:
   generating multiple sub-scores corresponding to multiple risk criteria, each sub-score identifying a degree to which the email message fits a particular risk criteria, and
   outputting, as the risk score, an aggregate value including a sum of the multiple sub-scores corresponding to the multiple risk criteria.

9. A method as in claim 8 wherein the electronic system includes an email server; and wherein receiving the email message from the network includes:
   acquiring the email message en route to the email server from an external device on the network.

10. A method as in claim 9 wherein the external central hub includes an electronic critical incident response device which is constructed and arranged to receive, review and identify whether email messages en route to multiple email servers are fraudulent; and wherein forwarding the copy of the email message to the external central hub through the network includes automatically sending the copy of the email message to the electronic critical incident response device when the aggregate value including the sum of the multiple sub-scores corresponding to the multiple risk criteria is greater than the predetermined threshold.

11. A method as in claim 10, further comprising:

after operating the electronic system for a period of time, adjusting the predetermined threshold to limit an amount of email messages received by the critical incident response device from the electronic system to a predefined percentage which is substantially less than 100%.

12. A method as in claim 8 wherein generating the multiple sub-scores corresponding to the multiple risk criteria includes:

scanning the email message for high-risk keywords, and providing, as a keyword sub-score, a overall keyword value based on a number of high-risk keywords and weights of the high-risk keywords found in the email message, the keyword sub-score being a component of the risk score.

13. A method as in claim 8 wherein generating the multiple sub-scores corresponding to the multiple risk criteria includes:

performing a set of comparison operations which compare email data contained within the email message to current facts regarding the email, and providing, as a consistency sub-score, a overall consistency value based on results of the set of comparison operations.

14. A method as in claim 8 wherein generating the multiple sub-scores corresponding to the multiple risk criteria includes:

performing a set of search operations which search for predefined sender address data contained within the email message, and providing, as a sender address sub-score, a overall sender address value based on results of the set of search operations.

15. A method as in claim 8 wherein generating the multiple sub-scores corresponding to the multiple risk criteria includes:

(i) scanning the email message for high-risk keywords, and (ii) providing, as a keyword sub-score, a overall keyword value based on a number of high-risk keywords and weights of the high-risk keywords found in the email message, the keyword sub-score being a component of the risk score;

(i) performing a set of comparison operations which compare email data contained within the email message to current facts regarding the email, and (ii) providing, as a consistency sub-score, a overall consistency value based on results of the set of comparison operations; and (i) performing a set of search operations which search for predefined sender address data contained within the email message, and (ii) providing, as a sender address sub-score, a overall sender address value based on results of the set of search operations;

the aggregate value including a sum of the overall keyword value, the overall consistency value, and the overall sender address value.

16. An electronic system, comprising:

a network interface which is constructed and arranged to connect to a network; and a controller coupled to the network interface, the controller being constructed and arranged to:

receive an email message from the network through the network interface, perform an authenticity analysis operation to determine authenticity of the email message, and forward a copy of the email message to an external central hub through the network interface when a result of the authenticity analysis operation indicates that the email message is not authentic, and refrain from sending the copy of the email message to the external central hub through the network interface when the result of the authenticity analysis operation indicates that the email message is authentic;

wherein the controller, when performing the authenticity analysis operation to determine authenticity of the email message, is constructed and arranged to:

generate a risk score based on the email message, and provide, as the result of the authenticity analysis operation, (i) a first value indicating that the email message is not authentic when the risk score exceeds a predetermined threshold, and (ii) a second value indicating that the email message is authentic when the risk score does not exceed the predetermined threshold.

17. An electronic system as in claim 16 wherein the controller, when generating the risk score based on the email message, is constructed and arranged to:

generate multiple sub-scores corresponding to multiple risk criteria, each sub-score identifying a degree to which the email message fits a particular risk criteria, and output, as the risk score, an aggregate value including a sum of the multiple sub-scores corresponding to the multiple risk criteria.

18. An electronic system as in claim 16 wherein the controller, when generating the risk score based on the email message, is constructed and arranged to:

provide, as the risk score, a numerical aggregation of a set of sub-score values, each sub-score value being a respective measure of riskiness of the email message from a perspective of a different risk criteria.

19. A computer program product having a non-transitory computer readable medium which stores a set of instructions that, when performed by a computerized device, cause the computerized device to:

receive an email message from a network;

perform an authenticity analysis operation to determine authenticity of the email message; and forward a copy of the email message to an external central hub through the network when a result of the authenticity analysis operation indicates that the email message is not authentic, and refrain from sending the copy of the email message to the external central hub through the network when the result of the authenticity analysis operation indicates that the email message is authentic;

wherein performing the authenticity analysis operation to determine authenticity of the email message includes:

generating a risk score based on the email message, and providing, as the result of the authenticity analysis operation, (i) a first value indicating that the email message is not authentic when the risk score exceeds a predetermined threshold, and (ii) a second value indicating that the email message is authentic when the risk score does not exceed the predetermined threshold.

20. A computer program product as in claim 19 wherein generating the risk score based on the email message includes:
- generating multiple sub-scores corresponding to multiple risk criteria, each sub-score identifying a degree to which the email message fits a particular risk criteria, and
- outputting, as the risk score, an aggregate value including a sum of the multiple sub-scores corresponding to the multiple risk criteria.

21. A computer program product as in claim 19 wherein generating the risk score based on the email message includes:
- providing, as the risk score, a numerical aggregation of a set of sub-score values, each sub-score value being a respective measure of riskiness of the email message from a perspective of a different risk criteria.

* * * * *